United States Patent [19]

Yung

[11] Patent Number: 5,378,556
[45] Date of Patent: Jan. 3, 1995

[54] BATTERY PACK

[75] Inventor: Kin H. Yung, Hong Kong, Hong Kong

[73] Assignee: Dual Voltage Co. Ltd., Kowloon, Hong Kong

[21] Appl. No.: 231,438

[22] Filed: Apr. 20, 1994

Related U.S. Application Data

[63] Continuation of Ser. No. 42,812, Apr. 5, 1993, abandoned.

[51] Int. Cl.6 ............................................. H01M 2/10
[52] U.S. Cl. ........................................ 429/99; 429/100
[58] Field of Search ................... 429/99, 100, 8, 1, 96, 429/97

[56] References Cited

U.S. PATENT DOCUMENTS 4,191,917  3/1980  Brown et al. ............... 429/97 X
5,227,262  7/1993  Ozer .

Primary Examiner—John S. Maples
Attorney, Agent, or Firm—Darby & Darby

[57] ABSTRACT

A battery pack for powering at least two different types of camcorders and being charged by at least two corresponding different types of chargers comprises a connector plate including a plurality of locking formations and electrical connection points. The connector plate further includes a movable tab, which in a first position enables the plate to connect with a first camcorder and charger and in a second position, connects with a different camcorder and charger. When the tab is in the first position, the plate cannot connect with the different camcorder or charger.

2 Claims, 6 Drawing Sheets

BATTERY PACK

This is a continuation, of application Ser. No. 08;042,812, filed Apr. 5, 1993, now abandoned.

The present invention relates to a battery pack and, in particular, a battery pack for powdering a camcorder.

BACKGROUND OF THE INVENTION

A battery pack for powering a camcorder has a connector plate for releasably securing the pack to a camcorder and/or a corresponding charger. The plate includes locking formations and connection points which are designed to engage with complementary formations and connection points on the camcorder and charger so that the battery pack can be secured onto either the camcorder or the charger and electrical connection be thereby established. While camcorders and chargers of the same brand usually have the same arrangement of locking formations and connection points, different makes of camcorders and chargers often have different arrangements of the locking formations and connection points and ways have therefore been devised to provide a single battery pack which is compatible with more than one make of camcorder and charger.

Two-way battery packs are known which are compatible with two different types of camcorders and chargers with type of camcorder and charger having a different arrangement of locking formations and connection points. The formations and connection points on the connector plate of the two-way battery pack are so designed that while the battery pack can be secured onto and thus be electrically connected with a first type of camcorder or charger, it can also be secured onto and electrically connected with a second type of camcorder or charger when it is rotated through 180° about the axis perpendicular to the plane containing the connector plate.

There are known to be at least three different types of camcorder and charger, each having a different arrangement of locking formations and connecting points. An obvious shortcoming of the existing two-way battery packs is that they cannot be used with more than two types of camcorder and charger.

SUMMARY OF THE INVENTION

It is therefore an object of the present invention to provide a battery pack in which the aforesaid shortcoming is obviated.

According to the present invention, there is provided a battery pack for powering a camcorder, the pack comprising (a) a body having a plurality of walls defining a cavity for receiving one or more batteries; and (b) a connector plate on the outside of the body for connecting the pack to the camcorder or charger, the connector plate including a plurality of locking formations and electrical connection points, the formations being adapted to engage with complementary locking formations on the camcorder or charger to thereby secure the pack and electrically connect the batteries to the camcorder or the charger; wherein the connector plate includes a tab which is movable relative to the body of the battery pack between a first position in which the plate is able to connect with at least one type of camcorder and charger and a second position in which the plate can connect with at least one different type of camcorder and charger which is unable to connect with the connector plate when the movable tab is in its first position.

Conveniently, the connector plate is able to connect with at least two different types of camcorder and their respective chargers when the movable tab is in the first position and with at least one different type of camcorder and charger when the movable tab is in the second position.

BRIEF DESCRIPTION OF THE DRAWINGS

The invention will now be discussed by way of an example with reference to the accompanying drawings wherein.

DESCRIPTION OF THE PREFERRED EMBODIMENT

Figure 1:
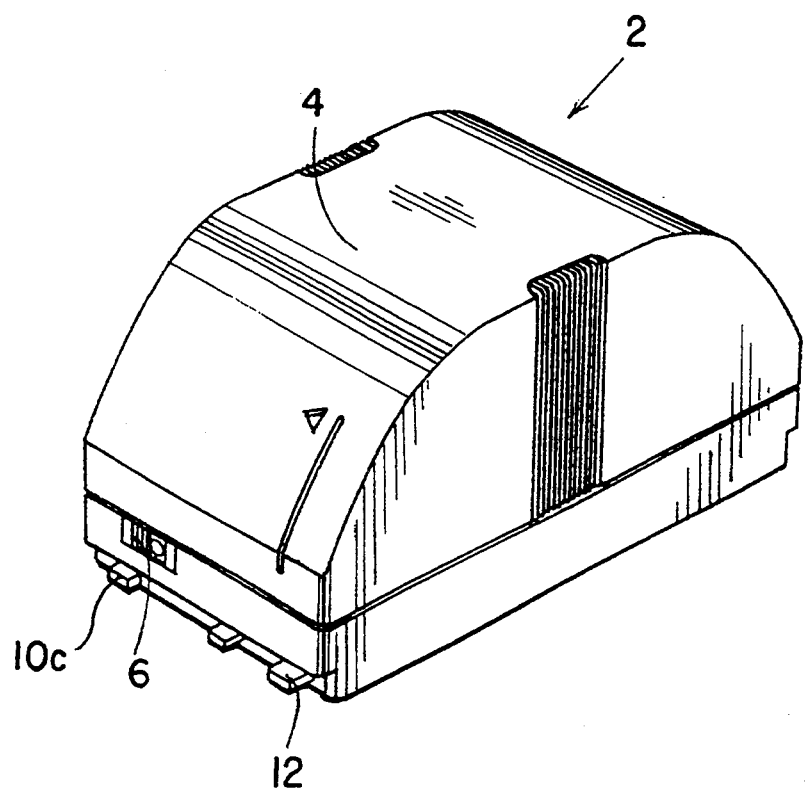
FIG. 1 is a perspective view of a battery pack according to the present invention wherein the movable formation is in the first position.

Referring to FIG. 1, there is shown a battery pack generally designated as 2 having a housing 4 for receiving one or more battery cells (not shown) and a switch 6 shown in the "on" position.

Figure 2:
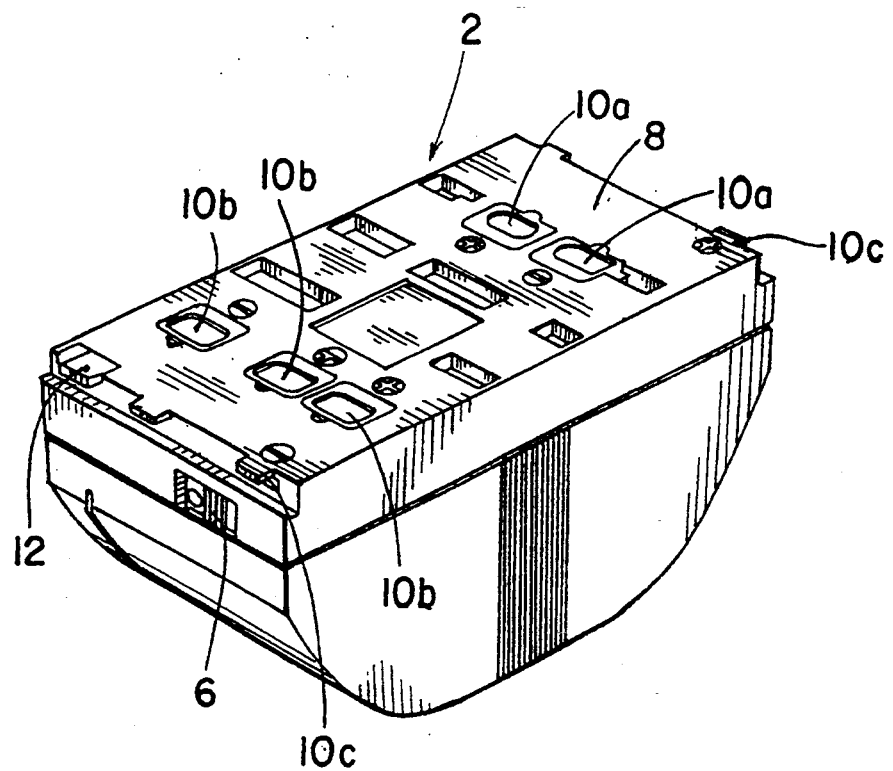
FIG. 2 is a perspective bottom view of the battery pack shown in FIG. 1.
Figure 3:
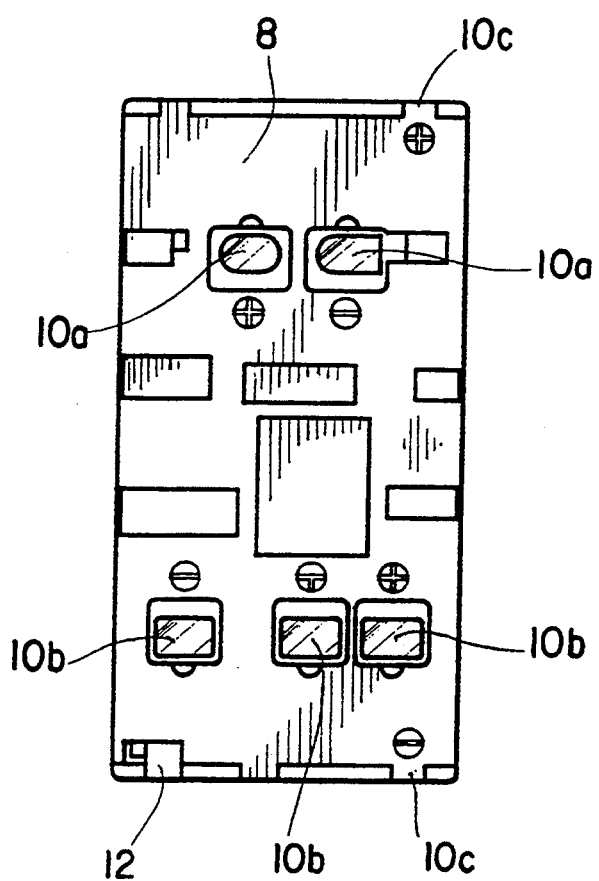
FIG. 3 is a bottom view of the battery pack shown in FIG. 1.
Figure 4:
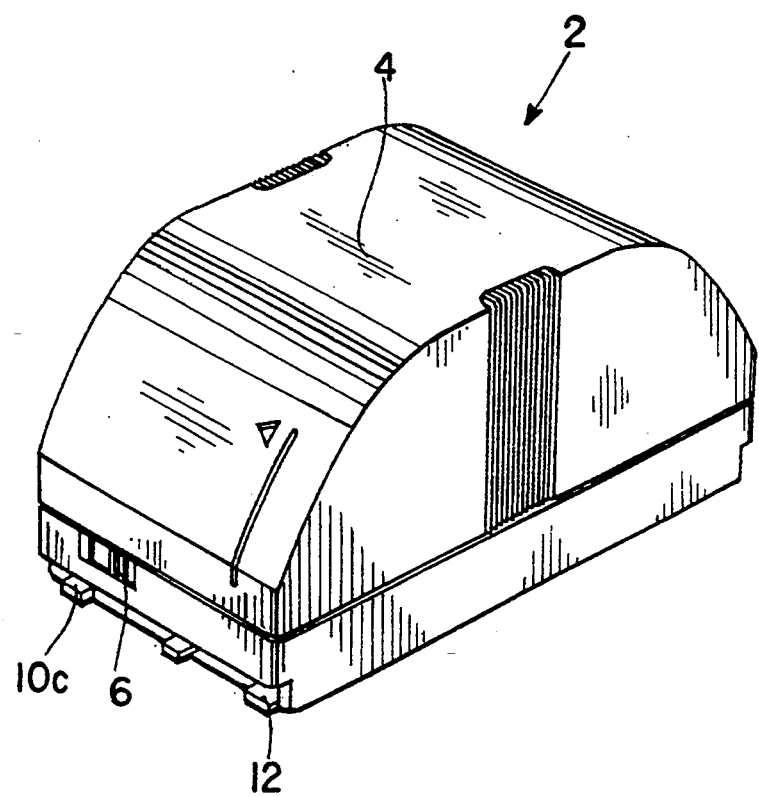
FIG. 4 is a perspective view of the battery pack wherein the movable formation is in the second position.
Figure 5:
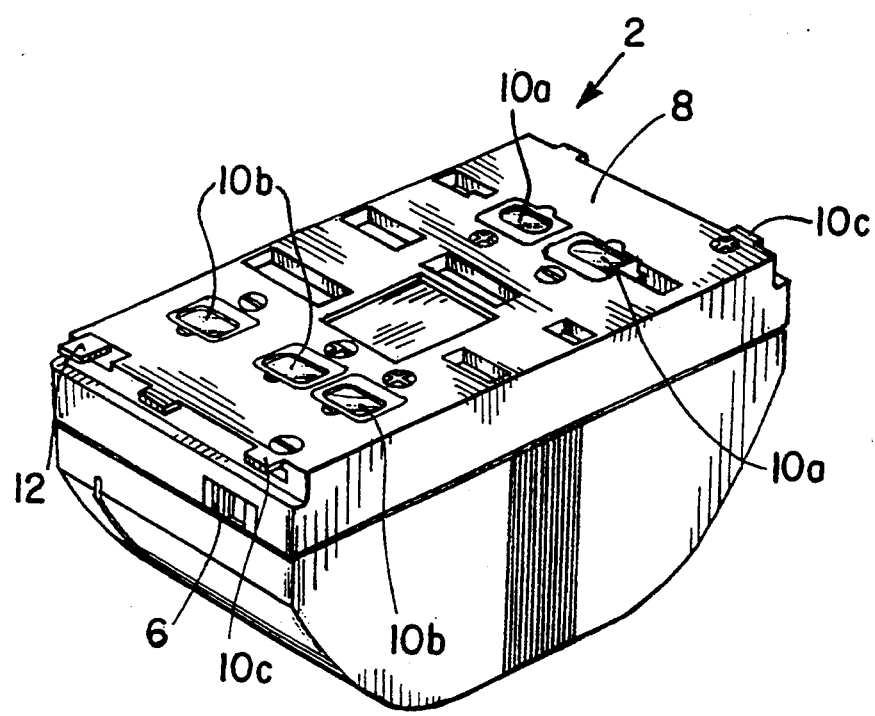
FIG. 5 is a perspective bottom view of the battery pack shown in FIG. 4.
Figure 6:
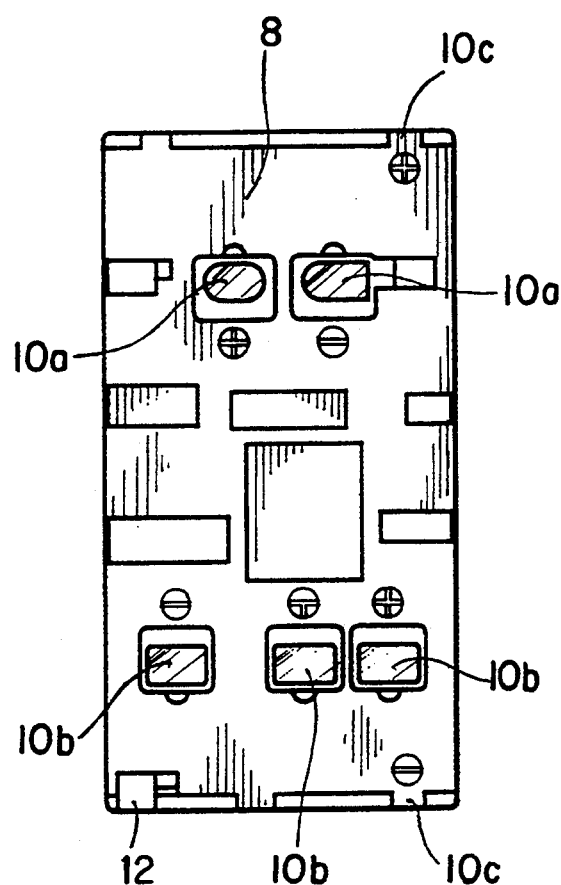
FIG. 6 is a bottom view of the battery pack shown in FIG. 4.

FIGS. 2 and 3 show the bottom of the battery pack 2 comprising a connector plate 8 having a number of electrical connection points 10a, 10b and 10c for connection with corresponding connection points on the camcorders or chargers (not shown). FIGS. 1, 2 and 3 show a movable tab 12 adjacent to one corner of the connector plate 8, which movable tab 12 is movable from a first position, as shown in FIGS. 1, 2 and 3 to a second position, as shown in FIGS. 4, 5 and 6. Tab 12 may be moved to different positions relative to the housing 4 so it will engage the complementary formed locking device in the corresponding position on different camcorders or chargers to provide a universal battery pack.

FIGS. 4, 5 and 6 correspond to FIGS. 1, 2 and 3 respectively, with the differences being that the switch 6 is shown in the "off" position and that the movable tab 12 is shown in the second position.

Connection points 10a are compatible with SONY (Trademark) camcorders and chargers, connection points 10b are compatible with PANASONIC (Trademark) camcorders and chargers and connection points 10c are compatible with HITACHI (Trademark) camcorders and chargers. While the battery pack 2 can be releasably secured to a SONY camcorder or charger, it may also be releasably secured to a PANASONIC camcorder or charger when the pack is rotated through 180° about an axis perpendicular to the plane containing the connector plate 8. The battery pack 2 is also compatible with a HITACHI camcorder or charger when the movable tab 12 is moved to its second position, as shown in FIGS. 4, 5 and 6.

It is therefore clear from the foregoing discussion that a battery pack in accordance with the present invention is compatible with three types of camcorder and chargers, each having a different arrangement of the locking formations and connection points. An obvious advantage of the present invention is that distributors and/or retailers of camcorders and chargers do not have to stock a variety of battery packs which are compatible with different types of camcorder and charger. Another advantage is that by stocking only one type of battery pack for use with several types of camcorder, this avoids the possibility that a certain type of battery pack may run out of stock.

It should be noted that while the above illustrates the preferred embodiment, it is possible to make changes and modifications to the illustrated example without departing from the spirit and scope of the invention.

I claim:

1. A battery pack for powering at least two different types of camcorders and being charged by at least two corresponding different types of chargers, the pack comprising:
   (a) a body having a plurality of walls defining a cavity for receiving one or more batteries:
   (b) a connector plate on the outside of the body for connecting the pack to the at least two camcorders and the at least two chargers, the connector plate including a plurality of locking formations and electrical connection points, the locking formations being releasably engageable with a plurality of complementary locking formations on the at least two camcorders and the at least two chargers to thereby selectively connect the pack with one of said at least two camcorders and said at least two chargers, whereby the electrical connection points are electrically connected to corresponding connection points on the at least two camcorders and the at least two chargers; and
   the pack includes a tab which is movable laterally relative to the connector plate between a first position in which the plate is able to selectively connect with complementary locking formations on one of the at least two camcorders and one of the at least two chargers and second position in which the plate can connect with different complementary locking formations on the other one of at least two camcorders and the other one of at least two chargers, said plate being unable to connect with said different complementary locking formations of said other one of the at least two camcorders and said other one of the at least two chargers when the movable tab is in the first position.

2. A battery pack as claimed in claim 1 wherein the connector plate is able to connect with at least two different types of camcorders and their respective chargers when the movable tab is in the first position and with at least one different type of camcorder and its respective charger when the movable tab is in the second position.

* * * * *